United States Patent
Palmieri

(10) Patent No.: US 8,863,651 B1
(45) Date of Patent: Oct. 21, 2014

(54) POPCORN POPPER BLOWOUT STOPPER

(71) Applicant: Anthony Louis Palmieri, Lincoln Park, MI (US)

(72) Inventor: Anthony Louis Palmieri, Lincoln Park, MI (US)

( * ) Notice: Subject to any disclaimer, the term of this patent is extended or adjusted under 35 U.S.C. 154(b) by 0 days.

(21) Appl. No.: 13/948,098

(22) Filed: Jul. 22, 2013

(51) Int. Cl.
*A23L 1/18* (2006.01)

(52) U.S. Cl.
CPC ..................................... *A23L 1/1812* (2013.01)
USPC ......................................... 99/323.9; 99/323.5

(58) Field of Classification Search
CPC ... A23L 1/1815; A23L 1/1812; A23L 1/1897; G07F 17/0078
USPC ............ 99/323.4, 323.5, 323.7, 323.8, 323.9; 126/299 C
See application file for complete search history.

(56) References Cited

U.S. PATENT DOCUMENTS

| | | | | |
|---|---|---|---|---|
| 2,570,126 A * | 10/1951 | Hobbs | ........................ | 99/323.5 |
| 3,807,596 A * | 4/1974 | Baker | ........................ | 220/369 |
| 4,397,874 A * | 8/1983 | Piotrowski | .................... | 426/450 |
| 4,435,628 A * | 3/1984 | Bowen et al. | ................. | 219/734 |
| 4,494,314 A * | 1/1985 | Gell, Jr. | ........................ | 34/368 |
| 5,501,139 A * | 3/1996 | Lee | ............................... | 99/323.9 |
| 6,056,146 A * | 5/2000 | Varakian et al. | .............. | 220/370 |

* cited by examiner

*Primary Examiner* — Reginald L Alexander

(57) ABSTRACT

The popcorn popper blowout stopper is an accessory unit of a round rimmed screen with an arm and a handle attached to be able to position the screen over the discharge outlet/heating chamber within the popper assembly. The screen will prevent kernels (but not the airflow) from leaving the popcorn popper burning pets, people/children and landing on the counters and floor. The accessory is important especially in the beginning and the end of the cycle when the output of popped corn is sparse and until the mass of popped corn pushes the accessory into the awaiting bowl. After the mass of popped corn subsides and the output is sparse, the accessory can then be placed again in the popcorn popper for blowout protection to the very end of the cycle. This accessory will fit the Presto, Orville Redenbacher, Conair, Great Northern and many other popcorn poppers.

1 Claim, 2 Drawing Sheets

POPCORN POPPER BLOWOUT STOPPER

BACKGROUND OF INVENTION

The present invention relates to an apparatus to better control the popping of popcorn in hot air poppers such as Presto, Orville Redenbacher, Conair, Great Northern and many other hot air popcorn poppers as well.

Hot air popcorn poppers have a basic structure of a chamber built in at the top center of the unit. This chamber is about three inches round in diameter and about five inches deep. At the very bottom of the chamber, extremely hot air is blown in and upward to pop/explode the popcorn kernels that have been poured into the popcorn popper chamber for popping. The fast moving hot air also moves the popped popcorn to the awaiting bowl.

Within the chamber it is very turbulent. Hot air is being blown in from the bottom and the popcorn starts to pop/explode. With the large opening at the top of the chamber (over 7 square inches), there is nothing to control the popcorn activity excepting for the popcorn to the bowl guidance shield that has a front opening that is over 15 square inches. The popped popcorn starts to come out hopefully into the awaiting bowl. With a combination of the fast moving hot air and the sparse just starting to pop/explode popcorn kernels, sometimes individual popped and not popped kernels are blown out of the popper on to the floor and counters. The kernels are very hot and dangerous.

BRIEF SUMMARY OF THE INVENTION

The present invention relates to an easy to use optional accessory for use with hot air popcorn poppers. It adds a more controlled handling of the popcorn kernels that are about to be popped and transported to the awaiting bowl without shooting hot popped and not yet popped corn kernels on to the floor and counters.

DETAILED DESCRIPTION

Figure 1:
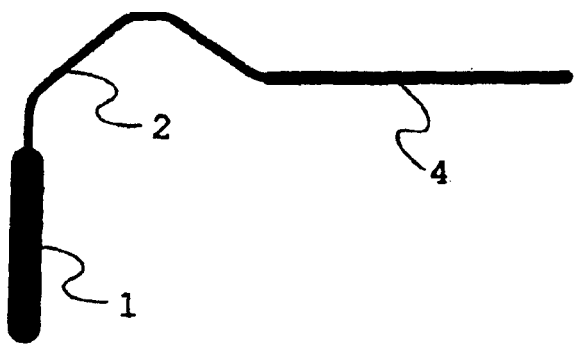
FIG. 1 is a side view of the invention.

FIG. 1 is a side view of the invention. The handle 1, the arm 2, the screen rim 4.

Figure 2:
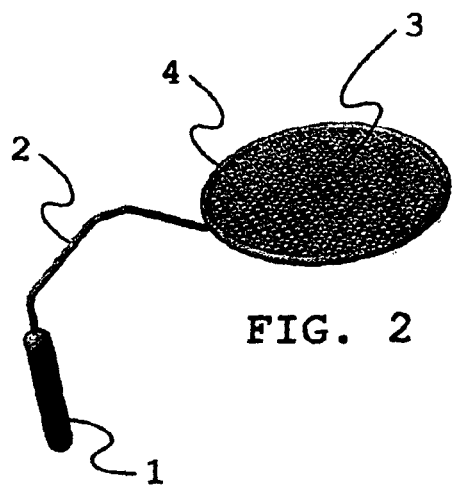
FIG. 2 is a perspective view of the invention.

FIG. 2 is a perspective view of the invention. The handle 1, the arm 2, the screen 3, the screen rim 4.

Figure 3:
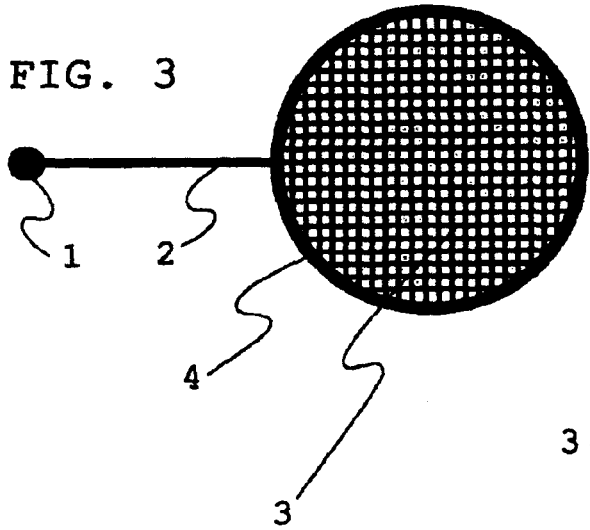
FIG. 3 is a top view of the invention.

FIG. 3 is showing a top view of the invention. The handle 1, the arm 2, the screen 3, the screen rim 4.

Figure 4:
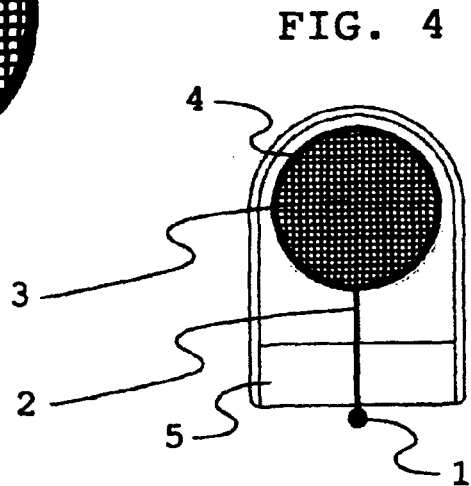
FIG. 4 is a top view of the invention as it is in place at the top of the popcorn popper heating chamber.

FIG. 4 is a top view of the invention atop the popcorn heating chamber. The handle 1, the arm 2, the screen 3, the screen rim 4, the popcorn popper assembly 5.

Figure 5:
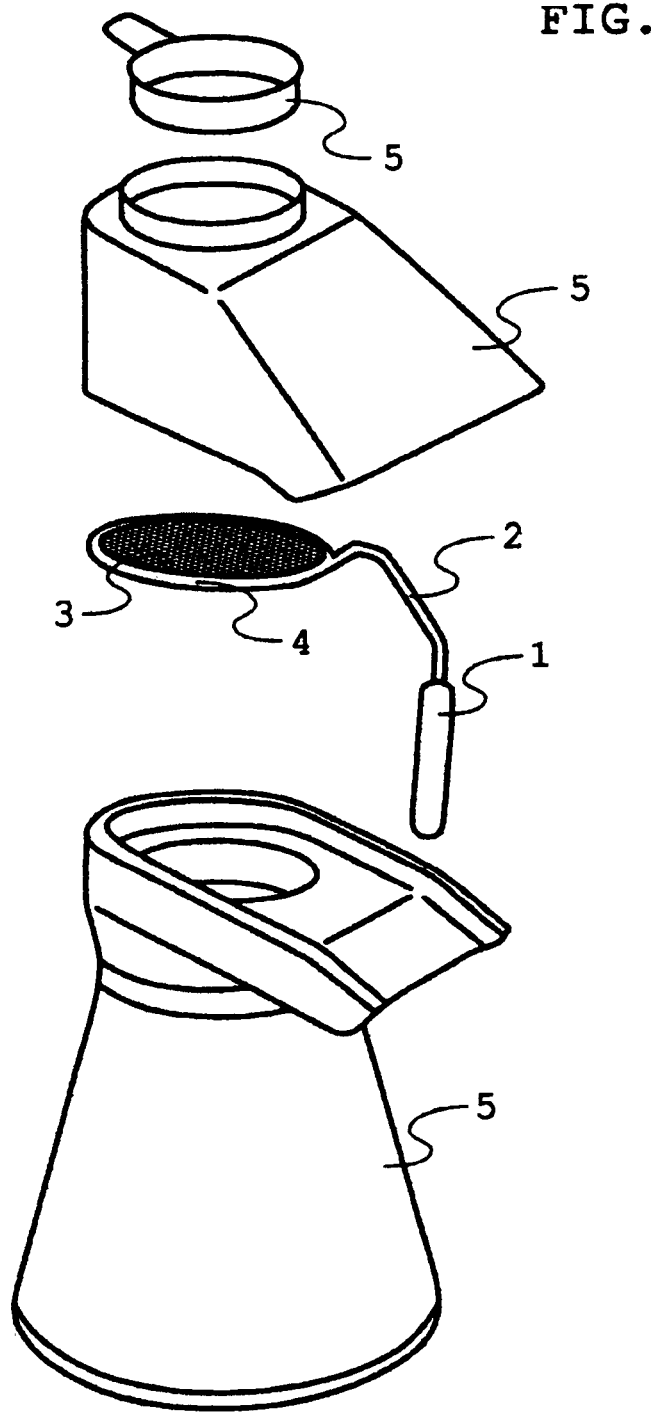
FIG. 5 is a view as to the exact location placement of the invention in the popcorn popper assembly.

FIG. 5 is a view as to the exact location placement of the invention in the popcorn popper assembly. The handle 1, the arm 2, the screen 3, the screen rim 4, the popcorn popper assembly 5.

In operation, popcorn is poured into the popcorn popper heating chamber of an open topped heating chamber. Holding handle 1 of the popcorn popper blowout stopper, the screen assembly 3 is positioned atop the opening of the popcorn heating chamber as you would place a cup onto a saucer. The popcorn popper is then turned on. As the popcorn pops, the volume of popped corn will push/eject the light weight popcorn popper blowout stopper from the heating chamber through the discharge outlet into an awaiting bowl. As soon as the mass output of popping corn slows down, the screen assembly 3 will be retrieved from the bowl and replaced again over the heating chamber. The popcorn popper blowout stopper will then be left over the chamber opening until the popping is completed. The popcorn popper is still hot and can then be lifted and the remainder of the popped and the not popped kernels can then be dumped into the bowl.

The invention claimed is:

1. A popcorn popper blowout stopper for use with a popcorn popper having an open topped heating chamber, a passageway for popped popcorn extending from above said heating chamber, and a discharge outlet, the popcorn popper blowout stopper comprising: a screen assembly; a circular rim located about a periphery of and secured to the screen assembly, said rim and screen assembly forming a planar surface sized and supported within said heating chamber; and a handle assembly secured to said screen assembly, said handle assembly comprising a first portion extending outwardly and upwardly from a periphery of said circular rim, a second portion horizontally extending from said first portion, a third portion extending downwardly and outwardly from said second portion, and a forth portion vertically extending downwardly from said third portion; wherein said planar screen assembly is placed within said open topped heating chamber by a user, said handle assembly extending to a location outside of said heating chamber, said screen assembly covering uncooked popcorn kernels and being removed from said heating chamber by way of said passageway and outlet as the kernels become fully cooked and popped.

* * * * *